Aug. 2, 1966 H. M. DAVIS 3,264,491

D.C. TO A.C. SIGNAL CONVERTERS

Filed May 15, 1963 2 Sheets-Sheet 1

Aug. 2, 1966 H. M. DAVIS 3,264,491

D.C. TO A.C. SIGNAL CONVERTERS

Filed May 15, 1963 2 Sheets-Sheet 2

United States Patent Office 3,264,491 Patented August 2, 1966

3,264,491
D.C. TO A.C. SIGNAL CONVERTERS

Herbert M. Davis, Barnehurst, Kent, England, assignor to Southern Instruments Limited, Camberley, England Filed May 15, 1963, Ser. No. 280,679
Claims priority, application Great Britain, June 4, 1962, 21,535/62
2 Claims. (Cl. 307—88.5)

The invention relates to D.C. to A.C. signal converters of the kind used for example in polarography and in biological studies.

One known method of detecting and measuring the minute direct current produced in solutions of salts due to electro-chemical reduction, and also for detecting small direct current in biological studies, is to convert the direct current there produced into corresponding alternating current which can be amplified to the degree required by means of an alternating current amplifier, while the output of the alternating current is converted back to a direct current, thereby providing an amplified direct current corresponding to the current being studied.

In one form of D.C. to A.C. signal converter for use with A.C. amplifiers the conversion takes place by a switching process carried out by a transistor in which a switching waveform, which is usually square, is applied between the base of the transistor and its collector, the emitter-collector path thus being caused to alternate between low and very high resistance on successive half cycles of the switching waveform. The direct current it is desired to amplify is applied to a terminal of a series impedance, ideally chosen to be high with respect to the low resistance afforded by the transistor on one half cycle, an alternating waveform being generated which varies in amplitude with the magnitude of the D.C. input.

The amplification possible with this type of converter (chopper) is limited by the switching waveform disturbances caused by the switching process which are injected into the A.C. amplifier together with the required signal. These disturbances arise from two main causes, namely, variation in the emitter potential in sympathy with the switching waveform giving rise to a square wave of approximately one millivolt in amplitude, and a superimposed transient occurring at the beginning and end of each half cycle arising from carrier storage and inter-electrode capacitance within the transistor. As such disturbances may be significantly greater than the signal it is desired to detect and measure, they seriously limit the degree of amplification possible with an amplifier of given overload capacity.

The object of the present invention is to provide a transistor D.C. to A.C. converter for use with an A.C. amplifier for the detection and measurement of small D.C. currents which overcomes the difficulties above referred to.

Figure 1:
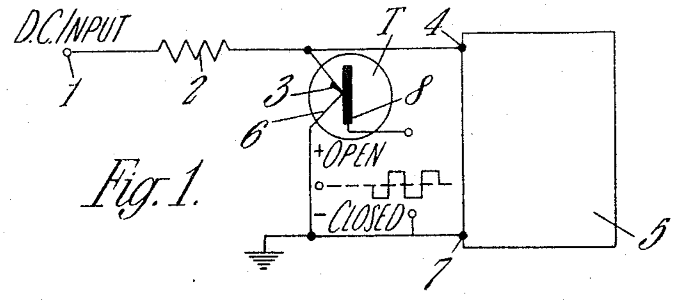
Figure 2:
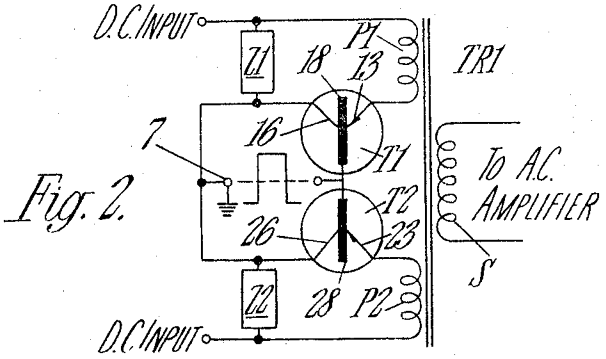
Figure 3:
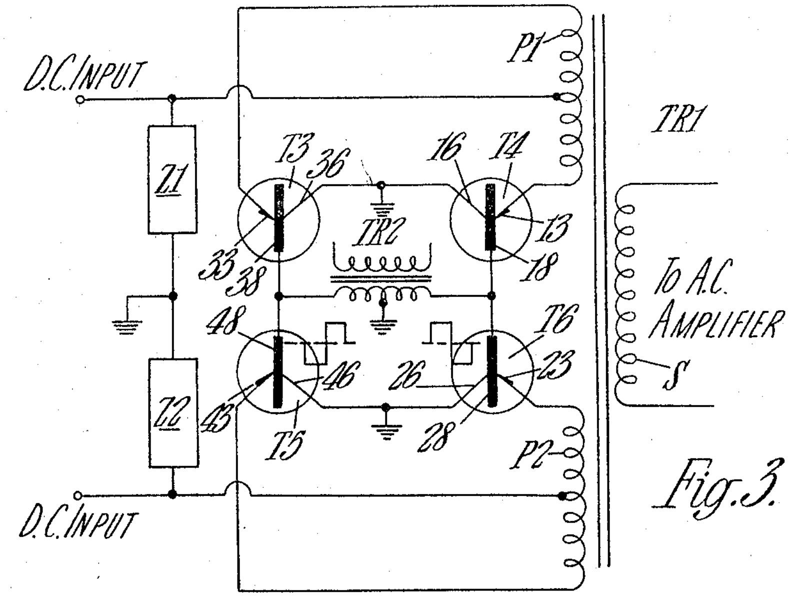
Figure 4:
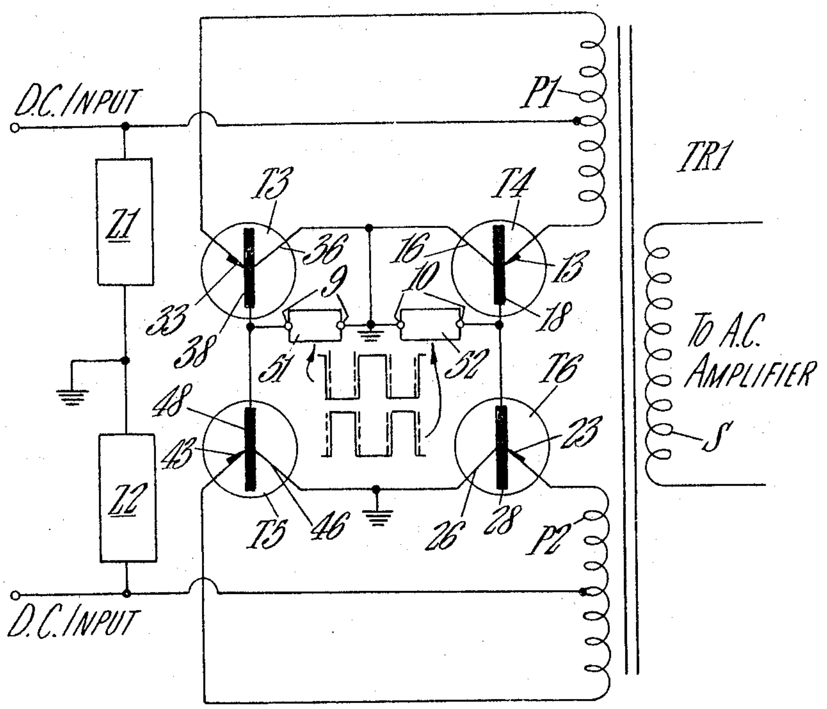

In accompanying drawings, given by way of example only:

FIGURE 1 shows the circuit arrangement of a known form of transistor converter, and FIGURES 2, 3 and 4 show circuit arrangements of three embodiments of the invention respectively.

The known converter shown in FIGURE 1 is provided with an input terminal 1 to which the direct current to be detected and measured is applied and from which by way of the resistor 2 is fed to the emitter 3 of the transistor T and to one input terminal 4 of the A.C. amplifier 5. The collector 6 is connected to the ground terminal 7 of the amplifier 5. A switching waveform, which is shown square, is provided from a source not shown and is applied between the base 8 of the transistor and its collector 6, whereby the emitter-collector path is caused to alternate between low and very high resistances on successive half cycles of the switching waveform. Since the direct current to be amplified is applied to the amplifier terminal 4 by way of the series resistor 2, which is high in respect of the low resistance afforded by the transistor on one half cycle, an alternating waveform is generated which varies in amplitude with the magnitude of the D.C. input.

Cancellation of the switching signal disturbances may be effected through the medium of a transformer TR1 having two identical primaries and a single secondary. In a simple form of the circuit shown in FIGURE 2, each primary P1 and P2 is returned to the A.C. amplifier ground terminal 7 through the emitter-collector path of each of two transistors T1, and T2 whose bases 18 and 28 are driven alternately positive and negative by means of a square switching waveform. The transistors T1 and T2 are driven in parallel so that their emitter-collector circuits "open" and "close" simultaneously. The primaries P1 and P2 of the transformer TR1 to which they are connected are wound in opposing senses so that equal currents flowing therein produce no net magnetic excitation of the core, and hence no signal in the secondary circuit S. If then the input circuits Z1 and Z2 connected to the other ends of the primaries P1 and P2 are arranged to be of identical impedance, correct conditions are established for cancellation of the disturbances due to switching to an extent determined by similarity of the transistor characteristics. Dissimilarity may be compensated, if not too large, by adjustment of the base currents of the transistors. In this simple form however the disadvantage remains that a ringing transient is set up in the transformer due to termination of current at the end of the half cycle in which the emitter-collector paths conduct.

The ringing effect may be virtually eliminated by adopting a more refined form of the circuit shown in FIGURE 3 in which the primaries P1 and P2 of the transformer TR1 are centre-tapped and connected to the D.C. input circuits, and the ends of the primaries are returned to ground separately through transistors T3, T4, T5 and T6 connected as described above. The transistors T3, T4, T5 and T6 have emitters 13, 23, 33 and 43 respectively, collectors 16, 26, 36 and 46 respectively, and bases 18, 28, 38 and 48, respectively. The switching waveform is applied between the base of each transistor and its collector by way of the transformer TR2 with the result that the operation of the circuit is such that switching disturbances are cancelled on both half cycles and ringing in the transformer is heavily damped. A remaining source of error is that due to the emitter-collector voltage difference which causes a small current to flow in the D.C. input circuit. This error may be removed by a known method, i.e., by returning the collectors of the transistors to a small positive potential, for example, 0.1 m.v., with respect to ground.

Basically the operation of the circuit arrangement shown in FIGURE 4 is similar to that described in relation to FIGURE 3 in as much as transistors T3 and T5 conduct, while transistors T4 and T6 cease to conduct simultaneously, and vice versa. However, sources 51 and 52 provide two switching waveforms which are of similar amplitude and of a mark/space ratio not equal to unity and which are related in phase in the manner shown. The switching waveforms are applied across the pairs of terminals 9 and 10 as indicated by the arrows.

In consequence all four transistors are in conduction together for a brief interval twice during each complete cycle of the switching waveform, with the result of increased damping of transients at the initiation and cessation of conduction, leading to still further reduction in the residual unwanted background.

In the circuits of FIGURES 2 and 3 and 4, a D.C. input signal may be applied to either input, or different input signals may be applied to the two inputs, the resultant alternating waveform at the secondary of transformer TR1 in the latter case being proportional to their difference.

In an application to differential polarography, the circuit is particularly advantageous as it permits the measurement of differences in current between two cell circuits at the $10^{-10}$ amps. level in the presence of standing currents several orders larger.

It is to be understood that the above description is by way of example only and that details for carrying the invention into effect may be varied without departing from the scope of the invention claimed.

I claim:

1. A D.C. to A.C. signal converter which includes a transformer having a core and at least two primary windings, each winding having a tapping point, and a secondary winding upon said core, means for applying first and second D.C. inputs between ground and each of said tapping points respectively, first and second input impedances connected across said first and second inputs, a first pair of transistor switching devices connected between ground and one end of each of said primary windings respectively, first switching means operatively connected to said first pair of devices for switching said first pair of devices cyclically on and off, during on periods said D.C. inputs flowing through said primary windings and causing opposing magnetic fluxes in said core, a second pair of transistor switching devices connected between ground and the other end of each of said primary windings respectively, and second switching means operatively connected to said second pair of devices for switching said second pair of devices on before said first pair is switched off and off again after said first pair is next switched on, during on periods said D.C. inputs flowing through said primary windings and causing opposing magnetic fluxes in said core in opposite directions to those during on periods of said first pair of devices.

2. A D.C. to A.C. signal converter which includes a transformer having at least two primary windings and a secondary winding, each of said primary windings having a tapping point, two impedances connected one between each tapping point and ground, means for applying first and second D.C. inputs one between each tapping point and ground, a first pair of switching devices connected one between each end of one of said primary windings and ground for permitting said first input to flow through said primary winding in one direction or the other, a second pair of switching devices connected one between each end of the other of said primary windings and ground for permitting said second input to flow through said other primary winding in one direction or the other, first switching means connected to one device of said first pair and one device of said second pair for switching simultaneously said one devices cyclically on and off at a predetermined frequency, second switching means connected to the other device of said first pair and the other devices of said second pair for switching simultaneously said other devices cyclically on and off at said predetermined frequency and in such phase relationship with said first switching means that for an interval twice during each complete cycle all four switching devices are switched on.

References Cited by the Examiner

UNITED STATES PATENTS

| | | |
|---|---|---|
| 3,082,369 | 3/1963 | Landis. |
| 3,089,077 | 5/1963 | Lee. |
| 3,122,715 | 2/1964 | Buck. |

ARTHUR GAUSS, *Primary Examiner.*

S. D. MILLER, *Assistant Examiner.*